Oct. 19, 1943.     H. O. PETERSON     2,332,253
COMBINING UNIT
Filed Jan. 21, 1942
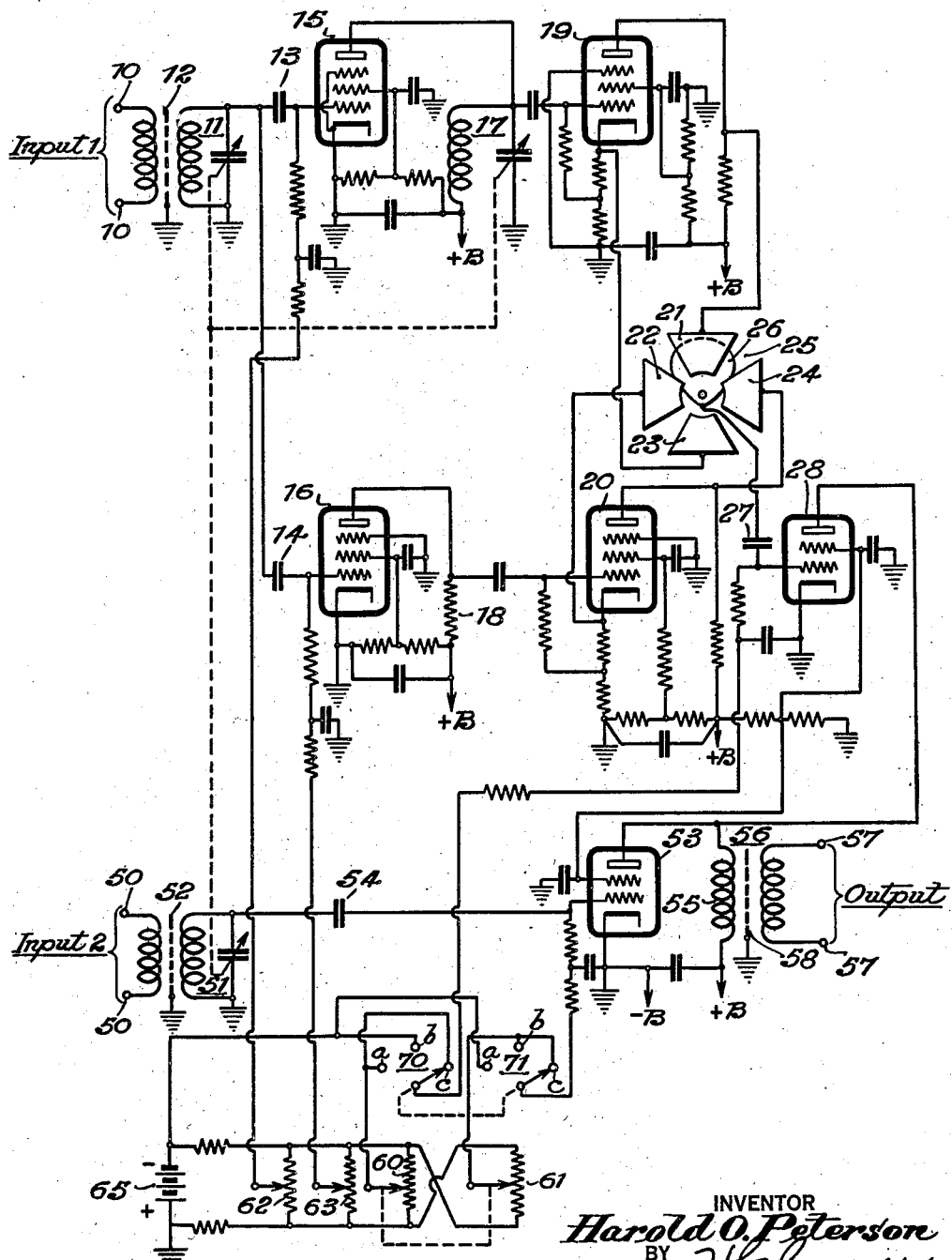
INVENTOR
*Harold O. Peterson*
BY *H. S. Grover*
ATTORNEY Patented Oct. 19, 1943

2,332,253

UNITED STATES PATENT OFFICE 2,332,253

COMBINING UNIT

Harold O. Peterson, Riverhead, N. Y., assignor to Radio Corporation of America, a corporation of Delaware Application January 21, 1942, Serial No. 427,555

12 Claims. (Cl. 178—44)

The present invention relates to structure for combining a plurality of high frequency waves in any desired phase and amplitude relation.

An object of the present invention is the selective or simultaneous application of a plurality of high frequency waves to a receiver input.

Another object of the present invention is the provision of means for applying a plurality of high frequency waves to a receiver input in any desired phase and amplitude relation.

A further object of the present invention is the provision of structure for varying the amplitude and/or phase of energy from a high frequency source applied to a load circuit.

The foregoing objects, and others which may appear from the following detailed description, are attained by the provision of means for splitting one high frequency wave into a pair of separate channels and displacing the phase of energy in such channels by 90 degrees. Each channel contains structure for converting from unbalanced to push-pull circuits and applying the push-pull output to a pair of opposite plates of a quadrantal differential condenser. A movable plate in the condenser then picks up the desired phase of energy which is then combined with another wave in a single output circuit. The combined wave is applied to a desired load circuit. Means are also provided for independently adjusting the amplitude of each of the waves before the combination.

The present invention will be more fully understood by reference to the following detailed description, which is accompanied by a circuit diagram showing an embodiment of the invention.

In the drawing an input circuit having terminals 10, 10 is shown into which one input from an antenna may be applied. A second input is provided with terminals 50, 50. The first input wave applied to terminals 10, 10 is coupled into tuned circuit 11 through electrostatic screen 12. The voltage across tuned circuit 11 is coupled through coupling condensers 13 and 14 to the control grids of tubes 15 and 16 in a parallel relationship thus dividing the wave into two separate channels in the anode load circuits 17 and 18 of tubes 15 and 16. Load circuit 17 is a parallel tuned circuit resonant to a frequency much lower than the operating frequency, and is therefore reactive, while load circuit 18 is purely resistive, within practical limits. The load circuit 17 for tube 15 is variable so that the impedance thereacross may be made equal in magnitude to that across resistance 18. The voltages applied, therefore, to the grids of following tubes 19 and 20 may be adjusted to have a phase quadrature relationship. The anode circuits of tubes 19 and 20 are coupled to the stator plates 21, 22 of a quadrantal differential condenser 25, while the cathode circuits of tubes 19 and 20 are coupled to opposite plates 23, 24 of the same condenser 25. Plates 23 and 24 of condenser 25 receive voltages at a phase relationship of 180 degrees with respect to the voltages applied to plates 21 and 22. This occurs because tubes 19 and 20 each have their load circuits divided into two equal parts, one part in the cathode to ground lead and the other in the anode to B+ lead. Since the potentials on the cathode and anode of each tube vary in opposite senses with respect to ground a phase splitting or inversion takes place. By the use of this arrangement of load circuits it is not necessary to provide transformers to give two outputs from the same tube, symmetrical with respect to a neutral midpoint. Adjacent plates of condenser 25, such as plates 21, 22 and 23, 24 receive voltages 90 degrees apart in phase since they are supplied from different channels. The rotor plate 26 of condenser 25 couples through condenser 27 to the grid of vacuum tube 28. Thus the wave from input terminals 10, 10 may be impressed on the grid of vacuum tube 28 in any desired relative phase. The output circuit for tube 28 contains primary 55 of an output transformer 56.

A second input wave applied to terminals 50, 50 is coupled by way of tuned circuit 51 to the control grid of vacuum tube 53. As in the case of the first mentioned input, an electrostatic screen 52 is provided between the input winding and the inductance of tuned circuit 51. The primary 55 of output transformer 56 is in the anode circuit of tube 53 and, consequently, the wave applied to input terminals 50, 50 appears in the primary winding 55 as well as does the wave applied to input terminals 10, 10. Output terminals 57, therefore, supply energy to a load connected thereto from both inputs. A grounded electrostatic shield 58 is provided between primary and secondary windings of transformer 56.

The relative gains of the branches carrying energy waves from input terminals 10 and input terminals 50 are adjustable by means of biasing potentiometers 60 and 61 which are connected across bias source 65. These may be gang-controlled, as shown, in such a way that the gain of one branch increases simultaneously with a decrease of gain of the other branch. Also, the gain of vacuum tubes 15 and 16 is arranged to be independently adjustable by adjustment of potentiometers 62 and 63 which are also connected across bias source 65. Thus the amplitude of voltages applied to the plates of differential condenser 25 may be adjusted.

As indicated, condensers in tuned circuits 11, 51 and 17 may be connected to a common control so that the proper relationship between them exists for all frequencies to which the system may be tuned. By means of selective switches 70 and 71 which are operated by a common control, wave energy from both of the pairs of input terminals may be caused to appear in output terminals 57 in position *c* of the selector switches, or selectively from each branch separately in positions *a* and *b*. If desired, a further position may be provided for switches 70 and 71 in which both branches are cut off. It will be found that these selective positions are useful in tuning up and adjusting the apparatus.

While I have particularly described and illustrated several embodiments of my invention, it is to be clearly understood that my invention is not limited thereto but that modifications may be made within the scope of the invention.

I claim:

1. An arrangement for combining a pair of high frequency waves including separate input connections for said waves, means for dividing one of said waves into two substantially equal portions having a mutual phase relationship of 90 degrees, means for obtaining from each of said portions a pair of potentials which vary symmetrically about a common reference potential, means for applying said potentials in a progressive phase relationship to successive plates of a quadrantal differential condenser, a connection from a movable plate of said condenser to an output circuit and means for applying the other of said waves to said output circuit.

2. An arrangement for combining a pair of high frequency waves including separate input connections for said waves, means for dividing one of said waves into two substantially equal portions having a mutual phase relationship of 90 degrees, means for obtaining from each of said portions a pair of potentials which vary symmetrically about a common reference potential, means for applying said potentials in a progressive phase relationship to successive plates of a quadrantal differential condenser, a connection from a movable plate of said condenser to an output circuit, means for applying the other of said waves to said output circuit and means for simultaneously varying the amplitude of said pair of waves in opposite directions.

3. An arrangement for combining a pair of high frequency waves including separate input connections for said waves, means for dividing one of said waves into two portions having a mutual phase relationship of 90 degrees, means for independently adjusting the amplitude of each of said portions, means for obtaining from each of said portions a pair of potentials which vary symmetrically about a common reference potential, means for applying said potentials in a progressive phase relationship to sucessive plates of a quadrantal differential condenser, a connection from a movable plate of said condenser to an output circuit and means for applying the other of said waves to said output circuit.

4. An arrangement for combining a pair of high frequency waves including separate input connections for said waves, means for dividing one of said waves into two portions having a mutual phase relationship of 90 degrees, means for independently adjusting the amplitude of each of said portions, means for obtaining from each of said portions a pair of potentials which vary symmetrically about a common reference potential, means for applying said potentials in a progressive phase relationship to successive plates of a quadrantal differential condenser, a connection from a movable plate of said condenser to an output circuit, means for applying the other of said waves to said output circuit and means for simultaneously varying the amplitude of said pair of waves in opposite directions.

5. An arrangement for combining a pair of high frequency waves including separate input connections for said waves, means for dividing one of said waves into two substantially equal portions having a mutual phase relationship of 90 degrees, means for applying each of said portions to an input circuit of a space current tube having an output circuit divided into equal parts on opposite ends of the space current path within said tube, connections from each end of said space current path of one of said tubes to a pair of opposite plates of a quadrantal differential condenser, connections from each end of the space current path of the other of said tubes to another pair of opposite plates of said condenser, a connection from a movable plate of said condenser to an output circuit and means for applying the other of said waves to said output circuit.

6. An arrangement for combining a pair of high frequency waves comprising separate input connections for said waves, means for dividing one of said waves into two substantially equal portions having a mutual phase relationship of 90 degrees, means for applying each of said portions to an input circuit of a space current tube having an output circuit divided into equal parts on opposite ends of the space current path within said tube, a condenser having two pairs of fixed sets of plates arranged at 90 degrees with respect to one another about a common center and a movable plate, connections from each end of said space current path of one of said tubes to one pair of opposite plates of said condenser, connections from each end of the space current path of the other of said tubes to the other pair of opposite plates of said condenser, a connection from said movable plate to an output circuit and means for applying the other of said waves to said output circuit.

7. An arrangement for combining a pair of high frequency waves including separate input connections for said waves, means for dividing one of said waves into two substantially equal portions having a mutual phase relationship of 90 degrees, means for applying each of said portions to an input circuit of a space current tube having an output circuit divided into equal parts on opposite ends of the space current path within said tube, connections from each end of said space current path of one of said tubes to a pair of opposite plates of a quadrantal differential condenser, connections from each end of the space current path of the other of said tubes to another pair of opposite plates of said condenser, a connection from a movable plate of said condenser to an output circuit, means for applying the other of said waves to said output circuit and means for simultaneously varying the amplitude of said pair of waves in opposite directions.

8. An arrangement for combining a pair of high frequency waves comprising separate input connections for said waves, means for dividing one of said waves into two substantially equal portions having a mutual phase relationship of 90 degrees, means for applying each of said portions to an input circuit of a space current tube having an output circuit divided into equal parts on opposite ends of the space current path within said tube, a condenser having two pairs of fixed sets of plates arranged at 90 degrees with respect to one another about a common center and a movable plate, connections from each end of said space current path of one of said tubes to one pair of opposite plates of said condenser, connections from each end of the space current path of the other of said tubes to the other pair of opposite plates of said condenser, a connection from said movable plate to an output circuit, means for applying the other of said waves to said output circuit and means for simultaneously varying amplitude of said pair of waves in opposite directions.

9. An arrangement for combining a pair of high frequency waves including separate input connections for said waves, means for dividing one of said waves into two substantially equal portions, means for applying one of said portions to a resistive load circuit and the other of said portions to a reactive load circuit whereby a mutual phase shift of 90 degrees between said portions is obtained, means for obtaining from each of said portions a pair of potentials which vary symmetrically about a common reference potential, means for applying said potentials in a progressive phase relationship to successive plates of a quadrantal differential condenser, a connection from a movable plate of said condenser to an output circuit and means for applying the other of said waves to said output circuit.

10. An arrangement for combining a pair of high frequency waves comprising separate tuned input circuits for said waves, means for dividing one of said waves into two substantially equal portions, means for applying one of said portions to a resistive load circuit and the other of said portions to a tuned load circuit, means for simultaneous tuning said input circuit to the frequency of said waves and said tuned load circuit to a frequency at one side of the frequency of said one wave whereby a phase relationship of 90 degrees is obtained between said two portions, means for obtaining from each of said portions a pair of potentials which vary symmetrically about a common reference potential, means for applying said potentials in a progressive phase relationship to successive plates of a quadrantal differential condenser, a connection from a movable plate of said condenser to an output circuit, means for applying the other of said waves to said output circuit and means for simultaneously varying the amplitude of said pair of waves in opposite directions.

11. An arrangement for combining a pair of high frequency waves comprising separate tuned input circuits for said waves, means for dividing one of said waves into two substantially equal portions, means for applying one of said portions to a resistive load circuit and the other of said portions to a reactive load circuit whereby a mutual phase shift of 90 degrees between said portions is obtained, means for applying each of said portions to an input circuit of a space current tube having an output circuit divided into equal parts on opposite ends of the space current path within said tube, connections from each end of said space current path of one of said tubes to a pair of opposite plates of a quadrantal differential condenser, connections from each end of the space current path of the other of said tubes to another pair of opposite plates of said condenser, a connection from a movable plate of said condenser to an output circuit, means for applying the other of said waves to said output circuit and means for simultaneously varying the amplitude of said pair of waves in opposite directions.

12. An arrangement for combining a pair of high frequency waves comprising separate tuned input circuits for said waves, means for dividing one of said waves into two substantially equal portions, means for applying one of said portions to a resistive load circuit and the other of said portions to a tuned load circuit, means for simultaneously tuning said input circuits to the frequency of said waves and said tuned load circuit to a frequency at one side of the frequency of said one wave whereby a phase relationship of 90 degrees is obtained between said two portions, means for applying each of said portions to an input circuit of a space current tube having an output circuit divided into equal parts on opposite ends of the space current path within said tube connections from each end of said space current path of one of said tubes to a pair of opposite plates of a quadrantal differential condenser, connections from each end of the space current path of the other of said tubes to another pair of opposite plates of said condenser, a connection from a movable plate of said condenser to an output circuit, means for applying the other of said waves to said output circuit and means for simultaneously varying the amplitude of said pair of waves in opposite directions.

HAROLD O. PETERSON.